July 29, 1924.
G. N. HEIN
1,503,160
LEVER OPERATED ADJUSTING MECHANISM
Filed Oct. 8, 1923
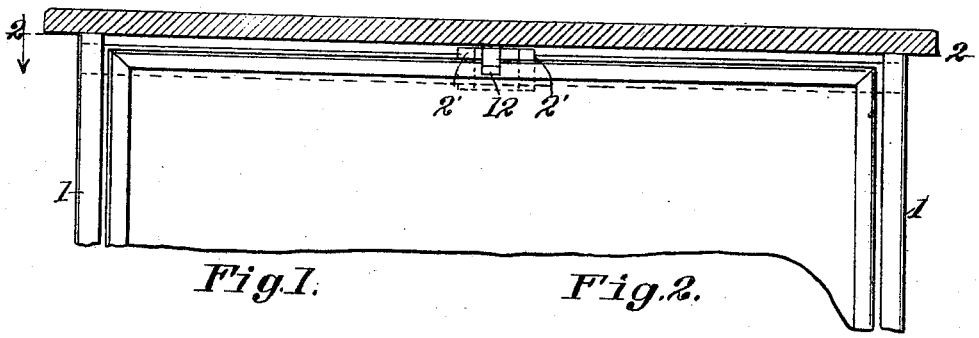
Fig.1.   Fig.2.
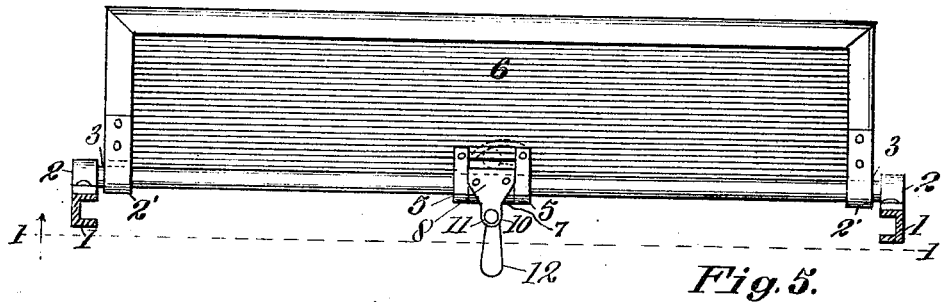
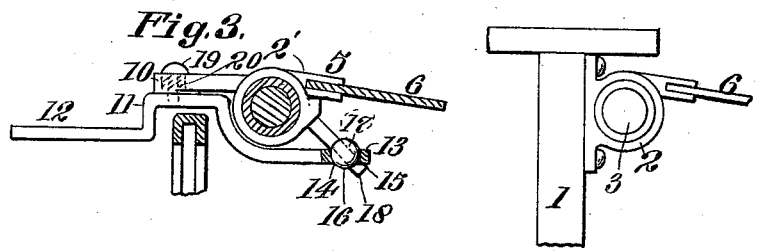
Fig.3.   Fig.5.
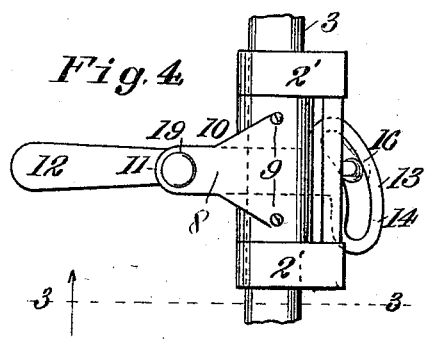
Fig.4.
Inventor.
G. N. Hein Patented July 29, 1924.

1,503,160

UNITED STATES PATENT OFFICE.

GEORGE N. HEIN, OF SAN FRANCISCO, CALIFORNIA.

LEVER-OPERATED ADJUSTING MECHANISM.

Application filed October 8, 1923. Serial No. 667,181.

*To all whom it may concern:*

Be it known that I, GEORGE N. HEIN, a citizen of the United States, residing at city and county of San Francisco and State of California, have invented certain new and useful Improvements in Lever-Operated Adjusting Mechanism, of which the following is a specification.

The present invention has to do with providing a simple compact mechanism designed for use in the pivotal adjusting of vehicle visors or sunshades.

The principal object of the invention is to provide a construction wherein an operating lever or member associated with the sunshade or visor support, is operatively connected to the visor or sunshade to enable the lever or operating member to be moved by a short distance and accomplish the adjustment desired of the visor or sunshade. Another object is to provide a construction wherein the lever is carried by the visor support, overcoming the necessity of providing a separate bracket support for the lever secured to the vehicle top or vehicle windshield.

The invention consists preferably in a lever formed with an arcuate slot and fulcrumed for movement either on a horizontal or vertical axis to a bracket fixed to a rod about which one edge of the visor or sunshade fulcrums, the rod being secured at its ends to suitable uprights, there being an anti-friction connection between a lateral extension from the visor fulcrum point and the arcuate slot of the lever.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

In the drawings forming a part of this application, Fig. 1 is a view in rear elevation.

Fig. 2 is a view in top plan on the line 2—2 of Fig. 1.

Fig. 3 is a cross sectional view on line 3—3 of Fig. 4.

Fig. 4 is an enlarged detailed plan view of the operating lever and associated parts and Fig. 5 is a view in end elevation.

In the drawings the numerals 1 indicate spaced supports to which brackets 2 are secured, the supports 1 being preferably the end standards of a vehicle windshield. The brackets 2 are connected by a rod 3 which is held from rotation. Fulcrumed on the rod 3 near its ends, and near its longitudinal center are the collars 2 which mount as at 5 the rear edge 6 of a visor or sunshade of any suitable construction. The center sleeve is cut away as at 7 and within said cutaway portion is mounted a bracket 8 held to the rod 3 by the set screws 9, the bracket extending rearwardly of the rod 3. Fulcrumed to the bracket as at 10 is a lever 11 having a hand grip portion 12 and the outer or free end 13 thereof is formed with a slot 14 illustrated as arcuate in plan. The side walls of the slot are concaved as at 15 to engage the edges of spherical member 16. The member has an opening 17 in which slides a lateral extension or arm 18 depending from the center collar.

It will be observed that swinging movement of the handle 12 will cause an oscillation of the collars 2' about rod 3 and a consequent pivotal adjustment of the sunshade or visor in advance of the vehicle windshield.

It will be observed that the vehicle operator within convenient reach of his driving position behind the wheel, can readily adjust the angle of the visor or sunshade to attain the maximum efficiency therefrom, and that such adjustment is capable of being obtained while the car or vehicle is in motion.

To retain the sunshade or visor locked in its adjusted position any suitable means or mechanism may be employed. For instance, the fulcrum member 10 may have interposed between its head 19 and the face of the lever 12 a coiled compression spring or washer 20.

The slot 14 may be either straight or curved, the latter form being illustrated in the present embodiment. However it is understood that to provide an operative structure, in the employment of a curved slot the curvature of the slot cannot be concentric with the pivot 10.

I claim:

1. In combination with a pivotally mounted sunshade, a lever fulcrumed to swing on a vertical axis and provided with a slotted end, and a pin associated with the sunshade and extending angularly therefrom adjacent its line of fulcrum and received within said slot to provide an operating connection between the sunshade and lever.

2. In combination with a pivotally mounted sunshade, a lever fulcrumed to swing on a vertical axis and provided with an arcuately slotted end, a bracket movable with the sunshade and forming the pivotal support for the lever and a pin associated with the sunshade and extending angularly therefrom into said slot to provide an operating connection between the sunshade and lever.

3. In combination with a vehicle sunshade, a fixed member for securing the same to a vehicle, a collar axially rotatable on the member and to which one edge of the sunshade is secured, a bracket extending laterally from the fixed member, a lever fulcrumed to the bracket and a pin and slot connection between the lever and the collar whereby operation of the lever will cause movement of the sunshade about its fulcrum.

4. In combination with a vehicle sunshade, a fixed member for securing the same to a vehicle, a collar axially rotatable on the member and to which one edge of the sunshade is secured, a bracket extending laterally from the fixed member, a lever fulcrumed to the bracket, a lateral extension projecting from the sleeve, said lever provided with an arcuate slot for receiving said stem extension to provide an operating connection between the sunshade and lever.

5. In combination with a vehicle sunshade, a horizontally disposed member, means for mounting the same to a support at its ends and for holding the same against rotation, a plurality of sleeves axially rotatable about the member, a sunshade connected at one edge to said sleeves to extend radially therefrom, a bracket extended laterally from said member, a lever pivotally mounted thereto and provided with an arcuate slot, and a lateral extension disposed at an angle relative to the sunshade and received in said slot, said parts adapted for removal as an unit from the support on the detachment of the mounting means.

In testimony whereof I have signed my name to this specification.

GEORGE N. HEIN.